April 28, 1959 B. W. KIPPENHAN 2,884,625

CODE GENERATOR

Filed Oct. 18, 1955 2 Sheets-Sheet 1

INVENTOR
BEVERLY WILLIAM KIPPENHAN

BY Ralph L. Thomas
ATTORNEY

April 28, 1959 B. W. KIPPENHAN 2,884,625

CODE GENERATOR

Filed Oct. 18, 1955 2 Sheets-Sheet 2

INVENTOR
BEVERLY WILLIAM KIPPENHAN

BY

Ralph L. Thomas
ATTORNEY 2,884,625

CODE GENERATOR

Beverly William Kippenhan, Poughkeepsie, N.Y., assignor to International Business Machines Corporation, New York, N.Y., a corporation of New York Application October 18, 1955, Serial No. 541,245

5 Claims. (Cl. 340—345)

This invention relates to an electrical error checking apparatus and more particularly to an apparatus for generating parity, error detecting, and error correcting signals for error detection and correction purposes.

In large scale digital computing apparatus, information is transferred from place to place within the computing system many times before a problem is solved. In order to derive an accurate solution it is essential that any errors resulting from a faulty transfer be detected and corrected or the word eliminated. If information is checked immediately after each transfer from place to place within the machine, errors occurring as a result of faulty transfer can be detected and the word caused to be re-transmitted correctly. The use of a checking system on point to point transfer of information aids the computer to reach an accurate result thereby saving computer time by eliminating the requirement for recalculating an erroneous result.

One method of detecting errors is the employment of a single code bit, sometimes referred to as a redundancy bit or a parity bit, to indicate whether the number of predetermined symbols represented in binary form is even or odd. Such a system is capable of detecting a single error or any odd number of errors which may occur as a result of faulty transfer. By employing more than one code bit for error detection purposes a larger percentage of errors resulting from faulty transfer may be detected. The use of more than one code bit for detecting isolated errors which may have resulted from any one of several types of faulty transmission is disclosed in an article entitled "Error Detecting and Error Correcting Codes" by R. W. Hamming in the Bell System Technical Journal, volume XXIX, April 1950, and in U.S. Patent Re. 23,601 of Hamming et al. By expanding the number of code bits, Hamming shows that it is possible to detect and correct one or more errors with various codes.

An object of this invention is to provide a novel circuit that can generate a code for use with data or information.

Another object of this invention is to provide a novel parity generator that can determine the requirements for parity directly from a counter circuit.

A further object of this invention is to provide a relatively inexpensive and efficient parity generator which is easy to construct and economical to maintain.

A still further object of this invention is to provide a novel parity generator that automatically generates the proper parity for a count as the count is being generated.

Another object of this invention is to provide a novel device for generating error checking and error correcting codes.

Still another object is to provide a novel apparatus for generating error checking and error correcting codes with a relatively small number of components.

A further object is to provide a novel device for generating error detecting and error correcting codes wherein the correcting or checking codes are originated simultaneously as the count is generated in a counter system.

A still further object of this invention is to provide a novel device for generating error detecting codes or error correcting codes characterized by simplicity and a small number of parts resulting in economy of construction and maintenance.

Other objects of the invention will be pointed out in the following description and claims and illustrated in the accompanying drawings, which disclose, by way of example, the principles of the invention and the best mode, which has been contemplated, of applying those principles.

Figure 1:
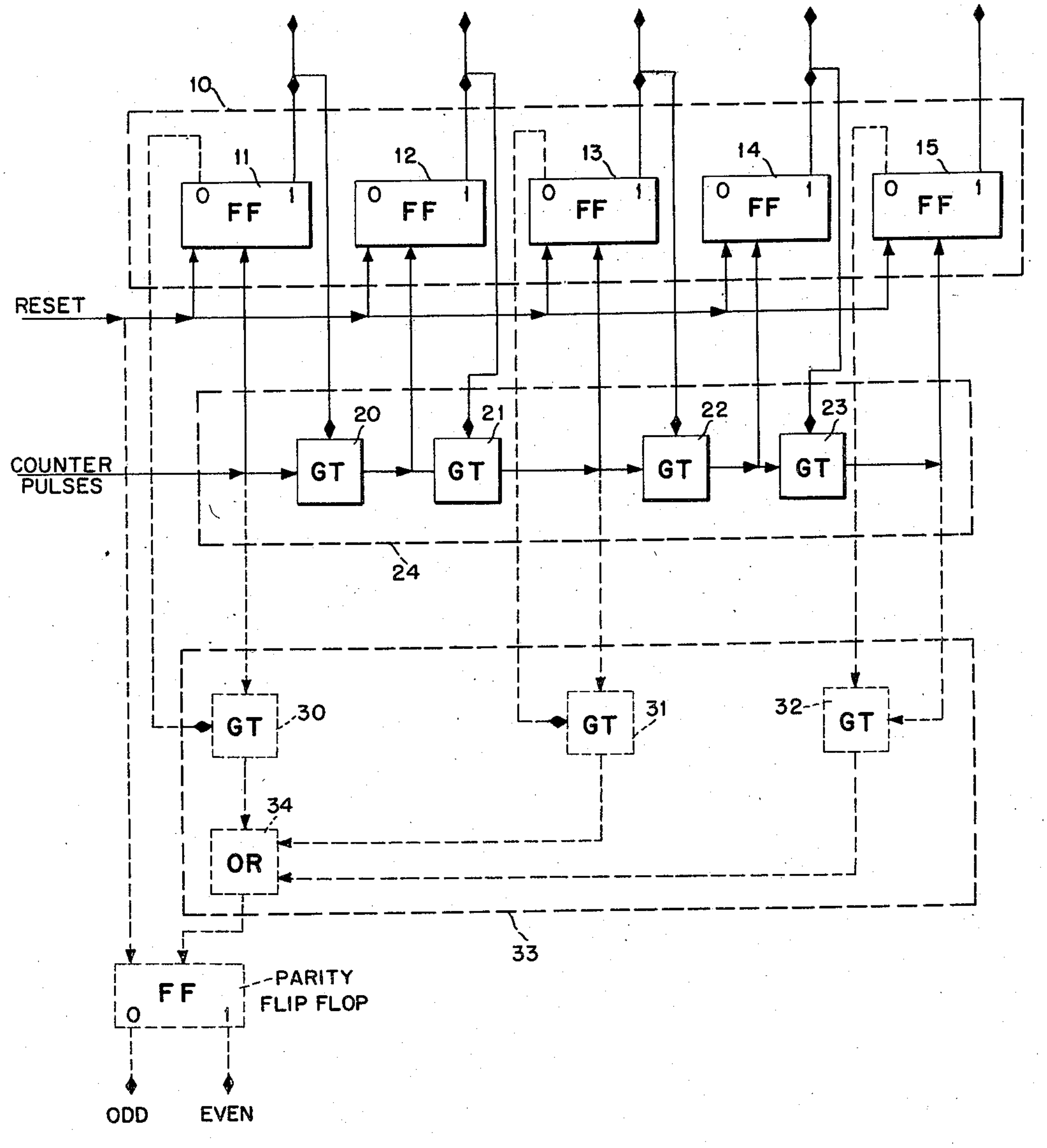
Figure 1 shows in block diagram form a system for generating proper parity in accordance with the principles of the present invention.

A register enclosed in the dotted line block 10 in Fig. 1 is composed of flip-flops 11 through 15 wherein the flip-flop 11 represents the $2^0$ order in binary representation, the flip-flop 12 the $2^1$ order, the flip-flop 13 the $2^2$ order and so forth. Each of the flip-flops is a bistable device wherein one of the stable states is referred to as the "Zero" state and the other as the "One" state. The stable states are indicated on the drawing by a "0" and "1". Each of the flip-flops 11 through 15 is set in the Zero state of conduction by a pulse applied to the line labeled Reset. A pulse applied to the input at the center of each flip-flop serves to complement or reverse the state of flip-flop. These flip-flops may be any suitable one of several well known types, but preferably they are of the type shown and described in copending application Serial Number 414,459 entitled "Electronic Digital Computer," filed March 5, 1954 by B. L. Sarahan et al.

Gates 20 through 23, enclosed within the dotted line block 24, are connected to the One output side of corresponding flip-flops 11 through 14 of register 10, and perform in conjunction with these flip-flops as a counting device to establish a count of the pulses received on the line labeled Counter Pulses. These gates are logical And circuits, sometimes shown as "coincidence gates," which require energization of all inputs simultaneously in order to yield an output. Although these gates may be any suitable one of several well known varieties, they preferably are of the type shown and described in the above mentioned copending application.

In operation the Reset line is pulsed to reset all flip-flops to the Zero state. A first counter pulse subsequently received on the line labeled Counter Pulse causes flip-flop 11 to be complemented to the One state. The complement operation of changing a flip-flop from its existing stable state to the opposite stable state may be accomplished in several ways. One method of accomplishing this, as shown in the above cited copending application, is to apply a single pulse to both input circuits simultaneously. A second counter pulse complements the flip-flop 11 back to the Zero state and passes through the gate 20 to complement the flip-flop 12 to the One state. After a third counter pulse complements the flip-flop 11 to the One state, the flip-flops 11 and 12 condition the gates 20 and 21 with a positive D.C. signal from the respective One sides. A fourth counter pulse complements flip-flop 11 to the Zero state, passes through gate 20 and complements flip-flop 12 to the Zero state and passes through gate 21 to complement flip-flop 13 to the One state. By following in a similar manner the operations as further counter pulses are successively applied, it can be seen that the counter gates enclosed within the dotted line block 24 in conjunction with the register enclosed within the dotted line block 10 perform as a counter circuit.

Gates 30 through 32, enclosed within the dotted line block 33, serve as parity gates for automatically generating the correct parity simultaneously as the counting operation is effected. The output of gates 30 through 32 is connected through an Or circuit 34, which may be any suitable one of many types well known to those skilled in the art, to the complement input of a flip-flop labeled "Parity Flip-Flop." If a register has $2^n$ stages or orders, the parity gates will have their D.C. level inputs connected to the Zero outputs of the bistable elements of the $2^m$ stages or orders where $n$ is any positive integer including zero and $m$ is any even positive integer including zero. Accordingly gates 30 to 32 have their D.C. inputs connected to the Zero side of flip-flops 11, 13 and 15 which represent the respective orders of $2^0$, $2^2$ and $2^4$.

In order to illustrate how the correct parity generation is automatically achieved, assume that the register 10 has its flip-flops 11 through 15 cleared to the Zero state by a pulse on the Reset line. The first counter pulse applied to the complement input of flip-flop 11, gates 20 and 30 fails to pass the counter gate 20 since this gate is receiving a negative D.C. level from flip-flop 11 which is in the Zero state. The parity gate 30 on the other hand is conditioned with a positive D.C. level from the Zero side of the flip-flop 11 and passes the first counter pulse through the Or circuit 34 to the complement input of the parity flip-flop which, having been previously left in the Zero state by a reset pulse, is complemented to the One state. This first counter pulse complements flip-flop 11 to the One state. It is pointed out that the resolution time of flip-flop 11, the time necessary for this flip-flop to change from one stable state to the opposite stable state, is sufficiently great for the first counter pulse to pass through the gate circuit 30 before the flip-flop 11 changes from the Zero to the One state in response to this first input pulse. After the first counter pulse, the count stored in register 10 is One and the parity flip-flop is in the One state indicating a parity of One if an even parity is used. The status of the parity flip-flop may be sampled for the purpose of indicating a parity of the counter contents or employed as an additional bit with the counter bits to assure that the total number of Ones is always odd or even. If an odd parity system is used the Zero output side of the parity flip-flop may be employed for the generation of a signal representative of a One. For the purposes of the present illustration however an even parity is assumed, and it may be generated, for example, from the positive level of the One output side of the parity flip-flop.

In response to a second counter pulse, the flip-flop 11 is complemented to the Zero state; the gate 20 passes a pulse which complements the flip-flop 12 to the One state and the parity remains unchanged. The third counter pulse complements the flip-flop 11 to the One state, and the parity gate 30 passes a pulse which complements the parity flip-flop to the Zero state. A fourth counter pulse complements the flip-flop 11 to the Zero state, passes through the counter gate 20 and complements the flip-flop 12 to the Zero state and then passes through the counter gate 21 to complement the flip-flop 13 to the One state; simultaneously with these events the parity gate 31 passes a pulse to complement the parity flip-flop to the One state. A fifth counter pulse complements the flip-flop 11 to the One state, and passes through the parity gate 30 to complement the parity flip-flop to the Zero state. A sixth counter pulse complements the flip-flop 11 to the Zero state, passes the counter gate 20 to complement the flip-flop 12 to the One state and leaves the parity flip-flop unchanged. A seventh counter pulse complements the flip-flop 11 to the One state, and passes the parity gate 30 to complement the parity flip-flop to the One state. An eighth counter pulse complements the flip-flops 11, 12 and 13 to the Zero state and the flip-flop 14 to the One state. A ninth counter pulse complements the flip-flop 11 to the One state as it passes the parity gate 30 to complement the parity flip-flop to the One state. Thus it is seen that as the counter gates 20 through 23 cause the count to be generated and stored in register 10, the parity gates 30 through 32 cause the correct parity to be generated and stored in the parity flip-flop. The above described operations are tabulated for convenience of inspection in Table I below.

*Table I*

| Count | Even Parity | Flip-Flops | | | | |
|---|---|---|---|---|---|---|
| | | $2^0$ | $2^1$ | $2^2$ | $2^3$ | $2^4$ |
| 0 | 0 | 0 | 0 | 0 | 0 | 0 |
| 1 | 1 | 1 | 0 | 0 | 0 | 0 |
| 2 | 1 | 0 | 1 | 0 | 0 | 0 |
| 3 | 0 | 1 | 1 | 0 | 0 | 0 |
| 4 | 1 | 0 | 0 | 1 | 0 | 0 |
| 5 | 0 | 1 | 0 | 1 | 0 | 0 |
| 6 | 0 | 0 | 1 | 1 | 0 | 0 |
| 7 | 1 | 1 | 1 | 1 | 0 | 0 |
| 8 | 1 | 0 | 0 | 0 | 1 | 0 |
| 9 | 0 | 1 | 0 | 0 | 1 | 0 |

The correctness of the count and parity generation for additional pulses can be verified by continuing in the manner above described.

If the column labeled Even Parity in Table I is examined, it becomes readily apparent that pairs of numbers recur in their true or complement form. For example, the first pair (0 and 1) represents the parity indicators for the counts of zero and one respectively; whereas the second pair (1 and 0) represents the parity for the counts of 2 and 3 respectively. Not that the parity indicators (1 and 0) of the second pair are the complement of the parity indicators (0 and 1) of the first pair. It can be seen by further inspection that the parity indicators (1001) for the respective counts of 4, 5, 6 and 7 are the complement of the parity indicators (0110) for the respective counts of 0, 1, 2 and 3. It can be shown by expanding the parity and the count columns in Table I that the parity indicators (taken as a column) progressively generate larger series which follow the same pattern, i.e., each further series is the complement of all the preceding series. This recurring pattern is illustrated in Table II below.

*Table II*

| Count | Respective Parity Indicators | Series |
|---|---|---|
| 0 and 1 | 01 | (1) |
| 2 and 3 | 10 | (2) |
| 4, 5, 6 and 7 | 1001 | (3) |
| 8, 9, 10, 11, 12, 13, 14 and 15 | 10010110 | (4) |

A definite pattern can be seen by noting that series 2 in Table II is the complement of series 1, that series 3 is the complement of both series 1 and series 2, and that series 4 is the complement of series 1, series 2 and series 3. This recurring pattern continues on for higher counts.

It can be seen that this recurring pattern is generated in the parity flip-flop of Fig. 1 if the parity gate tubes are placed on the Zero output side of each flip-flop representing a 2M order, where M is any even positive integer including zero, and these gates are sampled by the pulse that complements the associated flip-flop. The five stage counter circuit of Figure 1 meets all requirements necessary to generate proper parity indicators for a circuit of this type. In view of the foregoing explanation, it is within the province of one skilled in the art to increase or diminish the number of stages in the circuit of Fig. 1 in order to meet the demands of particular system requirements.

There has been shown and described one type of counter circuit for counting input pulses. According to the principles of the present invention, the novel result of generating parity is secured by the inclusion of a small number of gate circuits, one Or circuit and a storage device (exemplified herein by a flip-flop). Since the parity is provided automatically and simultaneously with the count, valuable computer time may be saved.

Figure 2:
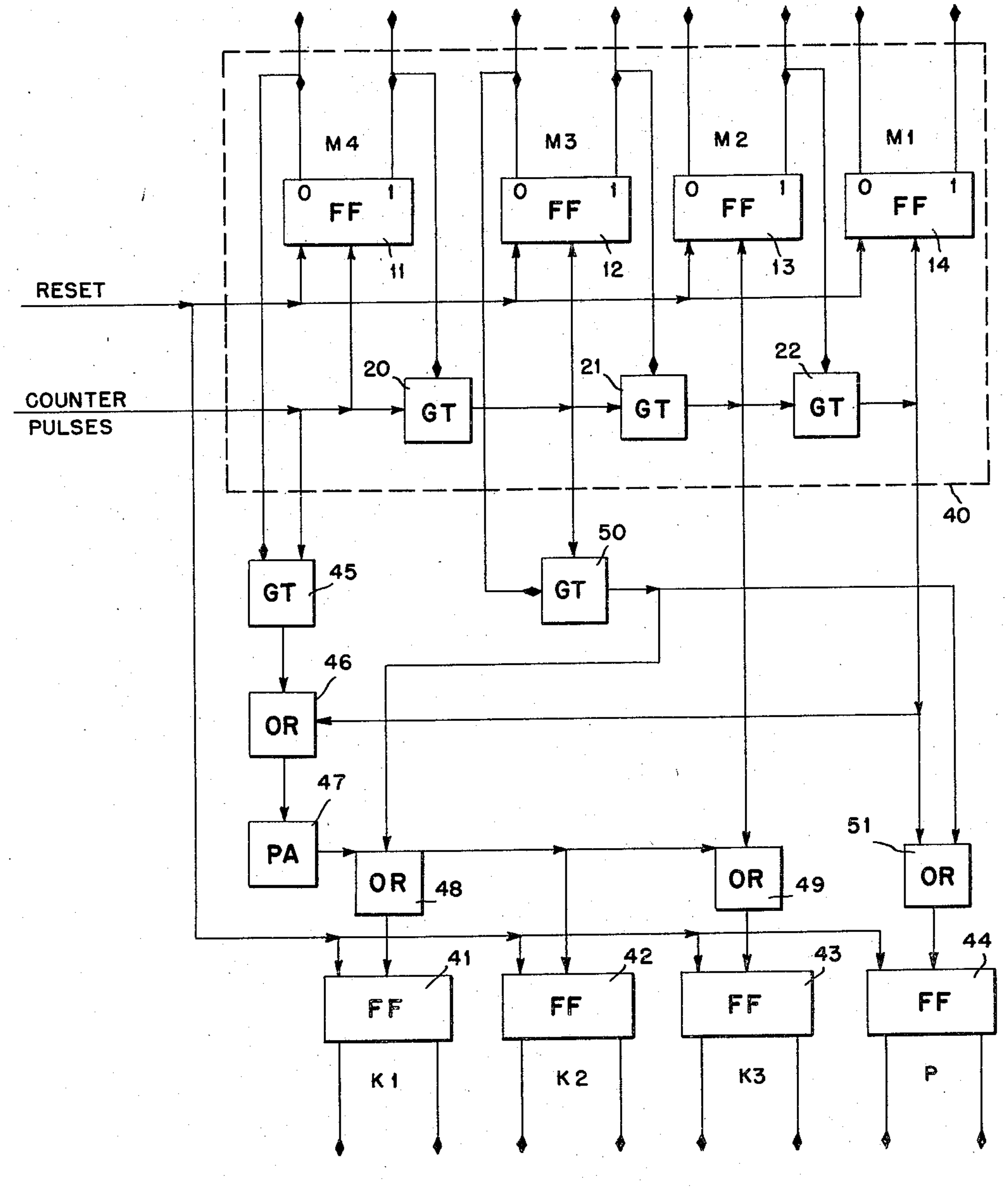
Figure 2 shows in block diagram form a system for generating error detecting and error correcting signals in accordance with the principles of the present invention.

Reference is made to Fig. 2 wherein the circuit in block schematic form serves to illustrate how the principles of the present invention can be employed to generate signals for error correcting and error detecting purposes. A seven position code with parity is selected to further illustrate the principles of the present invention although other codes are equally applicable.

Within dotted line block 40 is a four-stage counter circuit which is equivalent to the register 10 and gates 24 of Fig. 1, and since the construction and operation of each counter is the same, the reference numerals used in Fig. 1 are employed to designate corresponding parts in Fig. 2. The output lines from flip-flops 11–14 of the counter 40 provide information or data signals which it is desired to convey to a load device not shown while output lines from flip-flops 41–44 provide error detecting and error correcting signals which are conveyed with the information signals. These output signals are D.C. level signals which may be converted, if desired, to pulse signals by any suitable means such as gates, for example.

In order to generate error detecting and error correcting signals simultaneously with the count generated in counter 40, the counter pulses applied to flip-flop 11 and gate 20 are also applied to gate 45. If conditioned by the zero output of the flip-flop 11, gate 45 passes the pulses through an Or circuit 46 to a power amplifier 47 where suitable amplification takes place. Pulses from the power amplifier 47 are applied directly to the complement input of flip-flop 42 and through Or circuits 48 and 49 to the respective complement inputs of flip-flops 41 and 43. Thus a pulse from gate 45 serves to reverse the state of the flip-flops 41–43. When a pulse is passed by the gate 20 in the counter 40, it is applied to the gate 21 and the flip-flop 12 in order to generate the proper count and to a gate 50 for the purpose of generating error detecting and error correcting signals. Pulses from the gate 50 are applied through an Or circuit 51 to the complement input of the flip-flop 44 and through the Or circuit 48 to the complement input of the flip-flop 41. Thus a pulse passed by gate 50 serves to reverse the state of the flip-flops 41 and 44. If the gate 21 in the counter 40 passes a pulse, it not only helps to generate the proper count, but also reverses the state of the flip-flop 43 since the output of the gate 21 is coupled through Or circuit 49 to the complement input of the flip-flop 43. Whenever the gate 22 passes a pulse, all of the flip-flops 41–44 reverse their state since the pulse from the gate 22 is applied through the Or circuit 51 to the complement input of the flip-flop 44 and through the Or circuit 46 and associated circuits to the complement inputs of the flip-flops 41–43.

In order to illustrate the operation of the circuit in Fig. 2, assume that all of the flip-flops are set to the zero state by pulsing the Reset line and that the counter 40 is operated by applying pulses to the line labeled Counter Pulses. The first counter pulse is passed by gate 45 since the flip-flop 11 is in the zero state; consequently the flip-flop 11 is complemented to the One state. The pulse from gate 45 passes through the Or circuit 46, the power amplifier 47 to the complement input of flip-flop 42 and through Or circuits 48 and 49 to the complement inputs of respective flip-flops 41 and 43. Thus the counter 40 indicates a count of one and flip-flops 41 through 43 each indicate a one as error detecting and correcting signals. The parity flip-flop 44 is in the zero state indicating a parity of zero.

The 2nd counter pulse complements flip-flop 11 to the zero state and this second counter pulse is passed by gate 20 since flip-flop 11 was in the one state. The pulse passed by the gate 20 is applied to the complement input of flip-flop 12 to change it to the one state, and the pulse from gate 20 is also applied to the gate 50 which passes this pulse to the Or circuit 48 and to the complement input of flip-flop 41 to reverse this flip-flop to the zero state. The pulse from gate 50 is also applied through Or circuit 51 to the complement input of the parity flip-flop 44 to reverse it from the zero state to the one state. After the 2nd counter pulse the counter 40 indicates a count of two and flip-flops 41 through 43 indicate error detecting and correcting signals of 011 respectively. The parity flip-flop 44 indicates a parity of one.

If a 3rd counter pulse is received, the flip-flop 11 reverses from the zero state to the one state, and gate 45 passes a pulse since flip-flop 11 was in the zero state. This pulse is conveyed to the complement input of flip-flops 41 through 43 to reverse their states. After the 3rd counter pulse is received, the counter 40 indicates a count of three and the flip-flops 41 through 43 indicate 100 respectively as error detecting and correcting signals. The parity flip-flop 44 remains unchanged, indicating a parity of one.

The 4th counter pulse causes flip-flop 11 to be complemented to the zero state as gate 20 passes this pulse to the gate 21 and to the flip-flop 12, thereby changing it to the zero state. Since the flip-flop 12 was previously in the one state, gate 21 passes the pulse to the complement input of the flip-flop 13 and to the Or circuit 49, thereby complementing the flip-flop 13 to the one state and complementing the flip-flop 43 to the one state. After the 4th counter pulse is received, the counter 40 indicates a count of four; the flip-flops 41 through 43 indicate 101 respectively as the error detecting and correcting signals; and the parity flip-flop 44 remains in the one state, indicating a parity of one.

Upon receipt of the 5th counter pulse, the flip-flop 11 is complemented to the one state as the gate 45 passes a pulse which causes flip-flops 41 through 43 to be complemented. Thus after the 5th counter pulse is received, the counter 40 indicates a count of five; while the flip-flops 41 through 43 indicate 010 respectively as the error detecting and correcting signals; and the parity flip-flop 44 continues to indicate a parity of one.

The 6th counter pulse received complements flip-flop 11 to the zero state as gate 20 passes a pulse to the complement input of flip-flop 12 and to the gate 50. Thus flip-flop 12 is complemented to the one state as the pulse from gate 50 is passed by the Or circuits 48 and 51 to complement the respective flip-flops 41 and 44. After the 6th counter pulse is received, the counter 40 indicates a count of six; error detecting and correcting flip-flops 41 through 43 indicate 110 respectively. The parity flip-flop 44 has now changed to the zero state, indicating a parity of zero.

Upon receipt of the 7th counter pulse, flip-flop 11 is complemented to the one state as the gate 45 passes a pulse which complements the flip-flops 41 through 43. Thus the counter 40 now indicates a count of seven and the flip-flops 41 through 43 indicate error detecting and correcting signals 001 respectively. The parity flip-flop remains in the zero state, indicating a parity of zero.

Upon receipt of the 8th counter pulse the gates 20, 21 and 22 pass this pulse. Accordingly flip-flops 11, 12 and 13 are each complemented from the one state to the zero state, and the flip-flop 14 is complemented from the zero state to the one state. Further the pulse passed by gate 21 is applied to the Or circuit 49 to complement flip-flop 43; whereas the pulse passed by the gate 22 is applied to the Or circuit 51 to complement the parity flip-flop 44 from the zero to the one state; and the pulse from the gate 22 is also applied to Or circuit 46 which is passed in turn by the power amplifier 47 to complement flip-flops 41 through 43. Although the Or circuit 49 is pulsed by the output from gate 21 as well as the output from power amplifier 47, it serves effectively to supply a single input to the flip-flop 43.

Accordingly the flip-flop 43 undergoes a single change in state, namely, from the one to the zero state. After the 8th counter pulse is received by the counter 40 it indicates a count of eight while the flip-flops 41 through 43 indicate an error detecting and correcting code of 110 respectively. The parity flip-flop is changed to the one state and now indicates a parity of one.

The 9th counter pulse received by the counter 40 causes the flip-flop 11 to be complemented to the one state as the gate 45 passes a pulse which complements the flip-flops 41 through 43. Thus the counter 40 indicates a count of nine and the flip-flops 41 through 43 indicate an error detecting and correcting code of 001 respectively. The parity flip-flop 44 remains unchanged, indicating a parity of one.

The validity of the generation of the count, parity and error detection and correction code for additional pulses up to fifteen can be verified by continuing in the above described manner.

The four out of seven code is tabulated for convenience of inspection in Table III below. Symbols $K_1$ through $K_3$ are used to represent the status of the flip-flops 41 through 43 respectively; while the symbols $M_1$ through $M_4$ are used to represent the status of the flip-flops 14 through 11 respectively. It is pointed out that $K_1$ represents the parity of bits $M_1$, $M_2$ and $M_4$; $K_2$ represents the parity of bits $M_1$, $M_3$ and $M_4$; whereas $K_3$ represents the parity of bits $M_2$, $M_3$ and $M_4$. The parity flip-flop represented by the symbol P, indicates parity of all bits.

*Table III*

| Pulse | $K_1$ | $K_2$ | $K_3$ | $M_1$ | $M_2$ | $M_3$ | $M_4$ | P (even) |
|---|---|---|---|---|---|---|---|---|
| 0 | 0 | 0 | 0 | 0 | 0 | 0 | 0 | 0 |
| 1 | 1 | 1 | 1 | 0 | 0 | 0 | 1 | 0 |
| 2 | 0 | 1 | 1 | 0 | 0 | 1 | 0 | 1 |
| 3 | 1 | 0 | 0 | 0 | 0 | 1 | 1 | 1 |
| 4 | 1 | 0 | 1 | 0 | 1 | 0 | 0 | 1 |
| 5 | 0 | 1 | 0 | 0 | 1 | 0 | 1 | 1 |
| 6 | 1 | 1 | 0 | 0 | 1 | 1 | 0 | 0 |
| 7 | 0 | 0 | 1 | 0 | 1 | 1 | 1 | 0 |
| 8 | 1 | 1 | 0 | 1 | 0 | 0 | 0 | 1 |
| 9 | 0 | 0 | 1 | 1 | 0 | 0 | 1 | 1 |
| 10 | 1 | 0 | 1 | 1 | 0 | 1 | 0 | 0 |
| 11 | 0 | 1 | 0 | 1 | 0 | 1 | 1 | 0 |
| 12 | 0 | 1 | 1 | 1 | 1 | 0 | 0 | 0 |
| 13 | 1 | 0 | 0 | 1 | 1 | 0 | 1 | 0 |
| 14 | 0 | 0 | 0 | 1 | 1 | 1 | 0 | 1 |
| 15 | 1 | 1 | 1 | 1 | 1 | 1 | 1 | 1 |

The error detecting and correcting codes represented by $K_1$, $K_2$ and $K_3$ in Table III exhibit a pattern which can be determined from Table IV below.

*Table IV*

| Count | $K_1$ | $K_2$ | $K_3$ | Series | Action |
|---|---|---|---|---|---|
| 0 | 0 | 0 | 0 | 1 | Reset |
| 1 | 1 | 1 | 1 | | A |
| 2 | 0 | 1 | 1 | 2 | B |
| 3 | 1 | 0 | 0 | | A |
| 4 | 1 | 0 | 1 | 3 | C |
| 5 | 0 | 1 | 0 | | A |
| 6 | 1 | 1 | 0 | 4 | B |
| 7 | 0 | 0 | 1 | | A |
| 8 | 1 | 1 | 0 | 4 | A |
| 9 | 0 | 0 | 1 | | A |
| 10 | 1 | 0 | 1 | 3 | B |
| 11 | 0 | 1 | 0 | | A |
| 12 | 0 | 1 | 1 | 2 | C |
| 13 | 1 | 0 | 0 | | A |
| 14 | 0 | 0 | 0 | 1 | B |
| 15 | 1 | 1 | 1 | | A |

The column labeled "Series" in Table IV shows when like combinations of the codes $K_1$, $K_2$ and $K_3$ taken from Table III recur. The codes 000 and 111 for the respective counts of 0 and 1 are represented as series 1; the codes 011 and 100 for the respective counts 2 and 3 are represented as series 2; while the codes 101 and 010 for respective counts 4 and 5 are represented as series 3; and the codes 110 and 001 for the respective counts of 6 and 7 are represented as series 4. A discernible pattern is found in Table IV since the series 1, 2, 3 and 4 generated in counting to 7 are repeated in reverse sequence as series 4, 3, 2, 1 in counting from 8 to 15.

The column labeled "Action" illustrates what manipulation on the flip-flops 41–43 is necessary to generate the codes represented by $K_1$, $K_2$, $K_3$. The symbol "A" represents the action of complementing all three flip-flops 41–43 ($K_1$, $K_2$, $K_3$), symbol "B" the action of complementing the flip-flop 41 ($K_1$), and symbol "C" the action of complementing the flip-flop 43 ($K_3$). The circuits of Fig. 2 serve to perform on the flip-flops 41–43 those manipulations indicated in the "Action" column of Table IV simultaneously as the count is generated in the counter 40.

There has been shown and described a novel generating apparatus wherein a count and an error detecting and correcting code are generated simultaneously. Also shown and described is a parity generator for generating a parity signal as the count and the error detecting and correcting code are generated. The simultaneous generation of all three types of signals is accomplished automatically with a minimum of components, resulting in economy of construction and maintenance as well as a more reliable apparatus.

The specific embodiments illustrated serve to show that applicant's invention is applicable to the generation of all types of codes having a discernible pattern. The principle of the illustrated embodiments for generating a code for a counter is equally applicable to types of codes other than those shown herein, and other codes, more or less complicated, may be generated provided that the code bits are in some manner related to the count. The size of the counter as well as the type and number of code bits may be expanded or decreased as desired.

While there have been shown and described and pointed out the fundamental novel features of the invention as applied to preferred embodiments, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. An apparatus for automatically generating parity including in combination a register, counting means, and parity generation means; said register including a plurality of flip-flops connected together in binary counting fashion and representing $2^n$ orders where $n$ is any positive integer including zero and the "1" output of a flip-flop is connected to the "0" input of its successive flip-flop; said parity generation means comprising a plurality of parity gates each of which is coupled to an alternate flip-flop and conditioned to pass pulses when its corresponding flip-flop is in its "0" state, an Or circuit for orring the outputs of each parity gate to said parity generation means, and means for simultaneously applying counting pulses to said first flip-flop and said first parity gate whereby the parity generation means is actuated to generate a pulse at the same time that the count is generated in the register and in accordance with the number of the "1" states existing in said register.

2. A code generator for producing signals indicative of the parity of the bits representing a word in binary form comprising a plurality of flip-flop elements connected in binary counting fashion, a parity bit generator, an Or circuit in series with said parity bit generator, a plurality of gating elements coupled to alternate flip-flop elements so that each gate is in its open condition when its associated flip-flop element is in a predetermined stable state, each gating element being coupled to said Or circuit, means for simultaneously applying signals to be counted to said first flip-flop and said first gating element whereupon one or more of said gates will be open to transmit a signal pulse to said parity generator through said Or gate as said flip-flops respond in binary counting fashion to such counting signals, whereupon said parity generator will generate a parity bit whenever the total number of such flip-flops residing in the same stable state is of a predetermined parity.

3. A code generator for producing signals indicative of the parity of the bits representing a word in binary form comprising a plurality of bistable elements connected in binary counting fashion, a parity generator for generating a signal indicative of whether the number of similar states of said bistable elements is even or odd, a first plurality of gating elements wherein each gating element couples adjacent bistable elements to cause said bistable elements to count in a binary fashion, a second plurality of gating elements wherein each gating element of said second group couples preselected flip-flops to said parity generator, means for simultaneously applying pulses to be counted to the first flip-flop, first gating element of said first group of gating elements and first gating element of said second group of gating elements, each gating element being open or closed in the presence of a counting pulse in accordance with the stable state conditions of such flip-flops whereby said parity generator is rendered operative to produce a signal pulse indicative of the parity of the number of similar states of said plurality of bistable elements.

4. An apparatus for automatically generating parity including in combination a register, a source of pulses to be counted and parity generation means, said register being connected in binary counting fashion and including $n$ flip-flops representing $2^n$ orders where $n$ is any positive integer and each flip-flop has two stable states indicative of the presence or absence of a count in such flip-flops, a first group of $(n-1)$ gating elements wherein each of said group of gating elements couples adjacent flip-flops of said register, a second group of gating elements wherein each element of said second group couples an associated one of alternate flip-flops of said register with said parity generation means, means for simultaneously applying said pulses to be counted to the first flip-flop, first gating element of said first group of gating elements and first gating element of said second group of gating elements, each gating element being open or closed at the appearance of a counting pulse in accordance with the stable state conditions of such flip-flops at the time of appearance of such counting pulse whereby said parity generation means is rendered operative to produce a signal pulse in accordance with the parity of "1's" stored in said register.

5. An apparatus for automatically generating parity including in combination a register, counting means and parity generation means; said register including flip-flops representing $2^n$ orders where $n$ is any positive integer including zero, said flip-flops each having a complement input and first and second outputs; said counting means comprising a plurality of counter gates, one intermediate each order of said flip-flops, each counter gate having a D.C. input, a pulse input and a pulse output, a source of pulses to be counted, the pulse input of said $2^0$ counter gate being connected to said source of pulses to be counted, said D.C. input of each counter gate being connected to said first output of said flip-flops in the corresponding order, said pulse output of each counter gate being connected to the pulse input of the next higher order gate and to the complement input of the next higher order flip-flop whereby said counting means cause the count to be effected and stored in the flip-flops comprising said register; said parity generation means comprising a parity gate for each flip-flop in the $2^m$ order where $m$ is any even positive integer, each parity gate having a D.C. input connected to said second output of the flip-flop in the corresponding order, the $2^0$ parity gate having a pulse input connected to said source of pulses to be counted, the remaining parity gates associated with alternate higher orders and each having a pulse input connected to the pulse output of the counter gate in the next immediate lower order, an Or circuit, said parity gates having a pulse output connected to said Or circuit, a parity flip-flop having a complement input, said Or circuit having an output connected to the complement input of said parity flip-flop whereby in response to pulses from said source of pulses to be counted said register and counter gates cause both a count to be effected and stored in said register and said parity gates to automatically cause proper parity to be established in said parity flip-flop.

References Cited in the file of this patent

UNITED STATES PATENTS

| | | |
|---|---|---|
| 2,609,143 | Stibitz | Sept. 2, 1952 |
| 2,634,052 | Bloch | Apr. 7, 1953 |
| 2,674,727 | Spielberg | Apr. 6, 1954 |
| 2,719,959 | Hobbs | Oct. 4, 1955 |
| 2,724,104 | Wild | Nov. 15, 1955 |